(12) United States Patent
Goodman

(10) Patent No.: US 7,748,657 B1
(45) Date of Patent: Jul. 6, 2010

(54) TOOL FOR RAPID LOADING OF LINE ONTO A FISHING REEL

(76) Inventor: Michael N. Goodman, 4215 Winding Way, Apt. #16, Sacramento, CA (US) 95841

( * ) Notice: Subject to any disclaimer, the term of this patent is extended or adjusted under 35 U.S.C. 154(b) by 3 days.

(21) Appl. No.: 12/221,991

(22) Filed: Aug. 7, 2008

Related U.S. Application Data

(60) Provisional application No. 60/963,917, filed on Aug. 7, 2007.

(51) Int. Cl.
*A01K 89/01* (2006.01)
(52) U.S. Cl. ............................ 242/323; 242/250
(58) Field of Classification Search ............... 242/323, 242/250, 225–227, 251, 257; 43/21
See application file for complete search history.

(56) References Cited

U.S. PATENT DOCUMENTS

| 3,126,166 | A | * | 3/1964 | Weinberg | 242/250 |
|---|---|---|---|---|---|
| 4,209,098 | A | * | 6/1980 | Adams | 211/70.8 |
| 4,587,909 | A | * | 5/1986 | Bailey | 111/67 |
| 4,951,890 | A | * | 8/1990 | Sossamon | 242/486.8 |
| 5,950,508 | A | * | 9/1999 | Rossi | 81/451 |
| D416,267 | S | * | 11/1999 | Reilly | D15/139 |
| 6,015,111 | A | * | 1/2000 | Berke | 242/394 |
| 6,457,665 | B1 |  | 10/2002 | Koehler, Sr. |  |
| 6,676,895 | B2 | * | 1/2004 | Kuhns | 419/36 |
| 6,685,125 | B1 | * | 2/2004 | Tucci | 242/390.8 |
| 6,755,829 | B1 | * | 6/2004 | Bono et al. | 606/308 |
| 7,086,622 | B1 |  | 8/2006 | Whaley |  |
| 7,309,039 | B1 | * | 12/2007 | Stone | 242/225 |
| 2002/0096023 | A1 | * | 7/2002 | Sanford | 81/124.2 |
| 2005/0033296 | A1 | * | 2/2005 | Bono et al. | 606/61 |
| 2005/0066780 | A1 | * | 3/2005 | Kobert et al. | 81/466 |

* cited by examiner

*Primary Examiner*—Emmanuel M Marcelo
(74) *Attorney, Agent, or Firm*—Heisler & Associates

(57) ABSTRACT

The tool is coupleable to an arm of a reel of a fishing rod. The tool includes a shank at one end removably coupleable to a rotating drive. A cylinder is oriented opposite the shank with a hollow bore extending into a free end of the cylinder. A slot extends through a wall of the cylinder with an axial leg adjacent an entry of the slot and a circumferential leg spaced from the axial leg by a bend. The arm passes into the bore with portions of the arm first passing through the axial leg and then into the circumferential leg. The arm is thus securely held within the slot of the cylinder and the arm rotates when the cylinder is caused to rotate along with the shank when the shank is coupled to the drive and the drive is rotated, and line is drawn onto the reel.

16 Claims, 4 Drawing Sheets

TOOL FOR RAPID LOADING OF LINE ONTO A FISHING REEL

CROSS-REFERENCE TO RELATED APPLICATIONS

This application claims benefit under Title 35, United States Code §119(e) of U.S. Provisional Application No. 60/963,917 filed on Aug. 7, 2007.

FIELD OF THE INVENTION

The following invention relates to tools for use in loading line onto a fishing reel. More particularly, this invention relates to tools for utilizing a rotational drive such as an electric screwdriver or drill to engage an arm of a fishing reel to rapidly load line onto a fishing reel.

BACKGROUND OF THE INVENTION

One common apparatus utilized when fishing is a fishing rod with associated reel apparatus for handling of fishing line. Fishing reels come in a variety of different configurations. Common to all fishing reels is the ability to collect and deploy line from the reel as needed by the fisherman. The reel thus includes some form of line storage spool upon which the line is wrapped when the line is being collected onto the reel and is rapidly deployed off of the reel when line is to be deployed. On some reels the line storage spool rotates about an axis perpendicular to a long axis of a pole of the fishing rod. Such a configuration is common with bait casting type fishing reels. Other fishing reels orient a central axis of the line collection spool of the reel generally parallel with the pole of the fishing rod. Such a parallel configuration is common with spin casting type fishing reels.

Reels typically include some form of crank arm which can be rotated by the user to collect line within the reel. Such crank arms can have a single grip or a pair of grips mounted on two separate tips of the arm, depending on the configuration of arm for the reel. Often with spin casting reels the arm is of a single grip variety with the arm generally jogging away from an axis of rotation of the arm to a tip where the grip is located, so that a user can rotate the grip about the axis of rotation of the arm to cause the arm to rotate rapidly, storing line onto the reel.

To optimize the effectiveness with which the fishing rod is utilized, it is often desirable to match a type of line with the tackle utilized with the fishing rod. However, it can be difficult and time consuming to take one line off of a reel and put a different line upon the reel. In a manufacturing setting, large complex machinery can be utilized to rapidly load line of a desired type onto a reel. However, once the reel has been purchased and mounted onto a rod, such equipment is no longer available or suitable for placing of replacement line onto the reel. Accordingly, fisherman will typically hand rotate the arm and grip of the reel to load line off of a storage spool and onto the reel. Such a procedure is rather time consuming and tedious. Also, it is sometimes desirable to change line on a fishing reel while fishing, thereby decreasing the amount of time available for actual fishing that is unproductively utilized merely in loading replacement line onto the reel. Such wasted time is particularly disadvantageous during fishing competitions where time can be a precious commodity. Accordingly, a need exists for a tool to rapidly load line onto a fishing reel.

SUMMARY OF THE INVENTION

With this invention a tool is provided to facilitate rapid loading of fishing line onto a fishing reel. The tool is a rigid construct having two ends. A first end is fitted with a shank which can be received within a chuck or other removable attachment structure of a rotating power tool, such as an electric drill or electric screw driver, generally referred to as a driver. This shank would typically include facets thereon, such as in a hex pattern similar to that which is exhibited on many screwdriver tips suitable for insertion into a chuck of the electric screwdriver, drill or other driver.

An end of the tool opposite the shank is configured to engage the arm of the reel and with a central axis of the tool and a rotational axis of the driver aligned with the axis of rotation of the arm of the reel. In particular, the tool includes a cylinder that is provided with a bore extending along a central axis thereof from a tip most distant from the shank. The bore makes the cylinder substantially hollow.

A wall of the bore has a slot therein which is configured with an axial leg and a circumferential leg. The axial leg allows a portion of the arm of the reel to pass axially (along arrow B of FIG. 13) down into the bore with portions of the arm closer to the grip extending through the slot. The tool can then be rotated (along arrow E of FIG. 13) to cause the arm to rotate into the circumferential leg of the slot. The two legs are joined together preferably at a 90° bend. Preferably, the axial leg and circumferential leg of the slot are sized to have a tight fit with the arm of the reel for securely holding the arm within the slot of the tool. Once so engaged, the rotational axis of the arm is aligned with the shank of the tool and with the driver.

The driver can then be powered and cause the chuck to rotate (arrow F of FIG. 14), which in turn causes the tool to rotate (arrow H of FIG. 14) through the shank thereof. The slot of the tool acts on the arm to cause the arm to rotate (along arrow H of FIG. 14). Preferably, the driver is of a type which can rotate at a relatively high speed so that line can be drawn rapidly off of the spool (along arrow J of FIG. 10) and onto the reel.

A base joins the shank to the cylinder. This base would typically be in the form of a quasi-conical surface merely to provide a short transition between the shank and the cylinder (FIGS. 1-4). Both the shank, base and cylinder are preferably each formed from a single unitary mass of material, such as cast metal or injection molded plastic of a type having sufficient strength to handle the forces encountered in utilizing the tool.

In an alternative embodiment shown in FIGS. 5-8, an alternative base is provided which is more cylindrical in form and demonstrates a simplified structure for coupling the cylinder to the shank. The alternative base could be formed as a unitary mass along with the shaft and the cylinder or could have portions of the shank extending into the alternate base and portions of the alternate base extending into the cylinder with appropriate fasteners or bonding adhesives utilized to secure the alternate base to the cylinder and the shank.

A second alternative embodiment is depicted in FIGS. 9-12. This embodiment is similar to the embodiment of FIGS. 5-8 except that the shank, base and cylinder portions are each increased in length somewhat. Such additional length is desirable in some instances, such as where the grip at the end of the arm might otherwise interfere with operation of the driver, such as banging against knuckles of a user while gripping a handle on the driver. This embodiment of FIGS. 9-12 illustrates how axial lengths of the different portions of the tool can be adjusted to suit the particular needs of a user.

Furthermore, this alternative embodiment shows a second alternative slot which has a circumferential leg which extends further circumferentially than the circumferential legs of the slots of other embodiments. Near a closed end of the circumferential leg, detents are provided on either side of the slot. These detents define a region of slightly lesser width for the slot. When the cylinder is formed of an at least partially resilient material, such as plastic, these detents can be provided slightly closer together than a diameter of the arm of the reel. If the cylinder is formed of highly rigid material, the detents alone can be formed of a more resilient material. Thus, the arm can snap past the detents and into the circumferential leg adjacent the closed end thereof where the arm is securely captured during use of the tool of this invention. After use is concluded, the arm can then be snapped past the detents and out of the axial leg of the slot (in a direction opposite arrow B of FIG. 13).

This second alternative embodiment of FIGS. 9-12 also shows the second alternative slot with rounded corners so that the tool is less likely to damage the arm or present sharp edges that might catch on the user or other objects and cause any damage thereto.

While the tool is shown with a single slot, it is conceivable that a second slot could be provided opposite the slot shown. In such a configuration reels having arms with a configuration that jogs away from a rotational axis of the arm in two opposite directions could be accommodated by such a modified tool. Also, the slot width could be modified to accommodate fishing reels of different types. Conceivably different tools having different dimensions could be provided for each reel type. Alternatively, the slot could be formed with a resilient border that would allow arms having different diameters and widths to be accommodated within a single slot with resilient surfaces of the slot flexing to allow the arm to pass therein, even if the arm is larger than the slot.

OBJECTS OF THE INVENTION

Accordingly, a primary object of the present invention is to provide a tool for rapidly loading fishing line onto a reel of a fishing rod.

Another object of the present invention is to provide a method for rapidly loading line onto a fishing reel.

Another object of the present invention is to simplify the process of switching from one type of fishing line to another type of fishing line.

Another object of the present invention is to provide a simple method for overcoming a tangled fishing line on a reel by cutting the tangled line off of the reel and then utilizing the tool of this invention and a rotating drive to rapidly load new line onto the reel.

Another object of the present invention is to provide a tool for more rapidly and more easily loading fishing line onto a fishing rod reel.

Other further objects of the present invention will become apparent from a careful reading of the included drawing figures, the claims and detailed description of the invention.

DESCRIPTION OF THE PREFERRED EMBODIMENT

Figure 1:
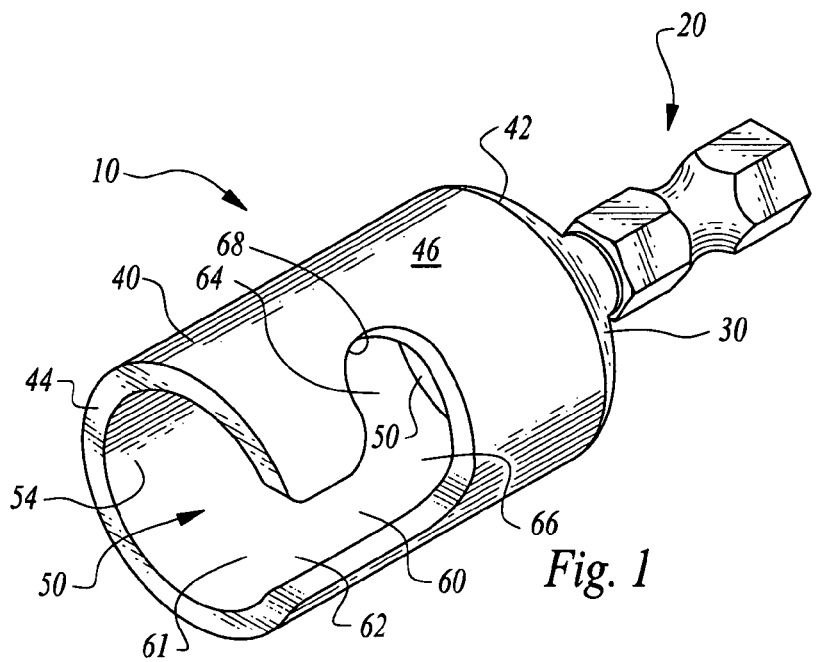
FIG. 1 is a perspective view of the tool of this invention according to a preferred embodiment.

Referring to the drawings, wherein like reference numerals represent like parts throughout the various drawing figures, reference numeral 10 is directed to a preferred embodiment of this invention in the form of a tool (FIGS. 13 and 14) that can be utilized to cause an arm A of a reel R on a fishing pole P to be rotated to automatically load line L off of a spool S and onto the reel R. The tool 10 includes a shank 20 that can be coupled to a chuck C of a drive D. The drive D rotates, causing the tool 10 to rotate. A slot 60 on the tool 10 engages the arm A so that when the drive D rotates (about arrow F of FIG. 14) the tool 10 and arm A are caused to rotate (along arrow H of FIG. 14) so that line L is drawn onto the reel R (along arrow J of FIG. 14).

In essence, and with particular reference to FIG. 1, basic details of the tool 10 of this invention are described according to a preferred embodiment. The tool 10 includes a shank 20 at one end thereof. This shank 20 extends axially and is configured to be readily coupled to a chuck C of a drive D (FIG. 14) so that the tool 10 can be caused to rotate (about arrow H of FIG. 14). The shank 20 is securely coupled to a base 30 that extends to a cylinder 40, with the cylinder 40 securely coupled to the base 30. Thus, when the shank 20 rotates, the cylinder 40 also rotates. The cylinder 40 includes a hollow bore 50 extending into a free end 44 of the cylinder 40 opposite the shank 20. The bore 50 thus makes the cylinder 40 hollow. A slot 60 is formed in an outer surface 46 of the cylinder 40. The slot 60 preferably includes an axial leg 62 extending from an entry 61 adjacent the free end 44 to a bend 66. A circumferential leg 64 extends circumferentially from the bend 66 to a closed end 68. The slot 60 has a width to receive the arm A of the reel R therein so that the tool 10 can engage the arm A of the reel R to cause the arm A to rotate when the tool 10 is in use.

Figure 2:
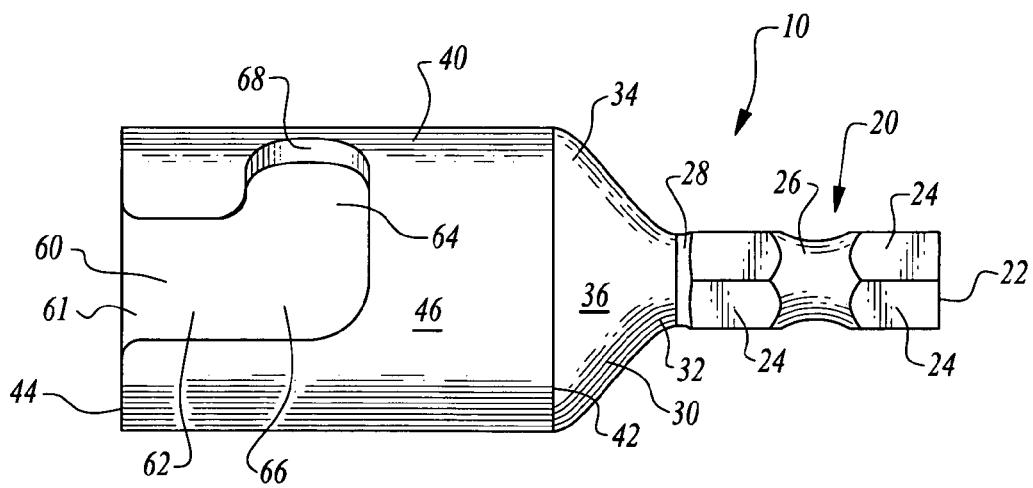
FIG. 2 is a front elevation view of that which is shown in FIG. 1.
Figure 3:
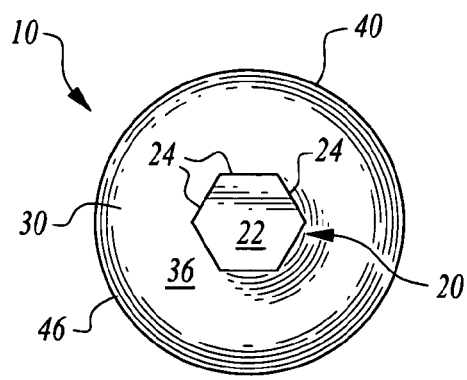
FIG. 3 is a right end elevation view of that which is shown in FIG. 2.

More specifically, and with particular reference to FIG. 2, details of the shank 20 are described. The shank 20 acts as a preferred form of a means to connect the tool 10 to a rotating drive. Other forms of connecting means could include mechanical fasteners, adhesives, universal joints and other removable connectors known in the art. It is also conceivable that the shank 20 could be permanently affixed to the drive D so that the drive D would be in the form of a special use tool that would only be utilized for rotating arm A of a reel R or other closely related devices.

The shank 20 is preferable rigid and elongate in form with a tip 22 spaced from an attached end 28 wherein the shank 20 is securely coupled to the base 30. Facets 24 preferably extend from the tip 22 to the attached end 28, with the facets 24 interrupted by a neck 26 at a midpoint of the shank 20. The facets 24 are provided to maximize an amount of torque able to be transmitted to the shank 20 from the drive D. Also, many drives D have a hexagonal bore adapted to receive tools therein. A ball is typically provided that can snap into a recess such as the neck 26 on the shank 20 to provide resistance to axial translation of the tool 10 relative to the chuck C of the drive D. The shank 20 could be smooth, as is often the case with drill bits, if desired. Other contours or a greater or lesser number than six facets could also alternatively be provided to accommodate chucks C of different configurations on the drive D.

Most preferably, the shank 20 is formed from a single unitary mass along with the base 30 and cylinder 40. As an alternative, the shank 20 could be permanently fastened to the base 30 and cylinder 40.

With continuing reference to FIG. 2, details of the base 30 are described according to a preferred embodiment. The base 30 provides a transition between the shank 20 and cylinder 40. In a simplest form of this invention, the base 30 could be dispensed with and the shank 20 coupled directly to the cylinder 40. The base 30 of the preferred embodiment includes a narrow end 32 adjacent the shank 20 and a wide end 34 adjacent to the cylinder 40. A quasi-conical surface 36 defines an outer surface of the base 30 from the narrow end 32 to the wide end 34. This surface is quasi-conical in that it exhibits a curving form adjacent the narrow end 32 and wide end 34 with the curves curving in opposite directions and preferably having similar radii of curvature. This curving quasi-conical surface 36 thus provides a smooth transition between the base 30 and the shank 20 adjacent the narrow end 32 and between the base 30 and the cylinder 40 at the wide end 34. Such smooth transitions can minimize stress concentrations that might otherwise build up adjacent abrupt transitions in the contour of the base 30.

The base 30 is preferably formed of a rigid material, such as steel or aluminum, along with the shank 20. As an alternative 20, the base 30 and shank 20 could be formed of a substantially rigid sufficiently high strength plastic or other readily injection moldable material, either along with the cylinder 40 or separate from the cylinder 40.

With continuing reference to FIG. 2, details of the cylinder 40 are described according to this preferred embodiment. The cylinder 40 defines a portion of the tool 10 most distant from the shank 20. The cylinder 40 is oriented about a centerline colinear with a long axis of the shank 20. The cylinder 40 is preferably rigid and either securely coupled to the base 30 and shank 20 or formed from a single unitary mass of rigid material along with the shank 20 and base 30.

The cylinder 40 includes a fixed end 42 adjacent the wide end 34 of the base 30. The cylinder 40 extends from the fixed end 42 to the free end 44 defining an end of the cylinder 40 most distant from the shank 20. An outer surface 46 of the cylinder 40 is cylindrical in form and extends from the fixed end 42 to the free end 44.

While the cylinder 40 is preferably cylindrical in form, some similar structure could be provided that would not necessarily have to be cylindrical. For instance, a hollow elongate structure having a square cross-section or a hexagonal cross-section or some irregular cross-section could also function in place of the cylinder 40. By forming the cylinder 40 with its circular cross-section cylindrical shape, a structure is provided that has a minimum of vibration caused by rotation of the tool 10 by the drive D. Also, the cylinder 40 with this shape avoids sharp or abrupt edges or surfaces that might catch on sensitive structures and potentially cause damage.

Figure 4:
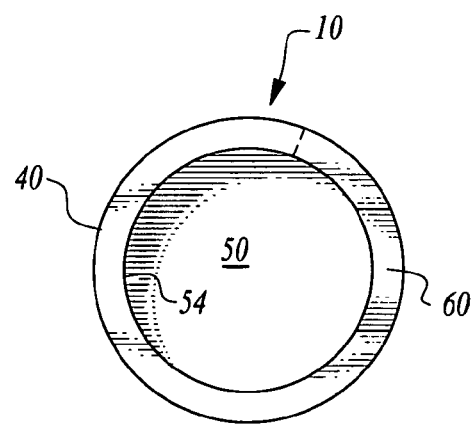
FIG. 4 is a left end elevation view of that which is shown in FIG. 2.
Figure 5:
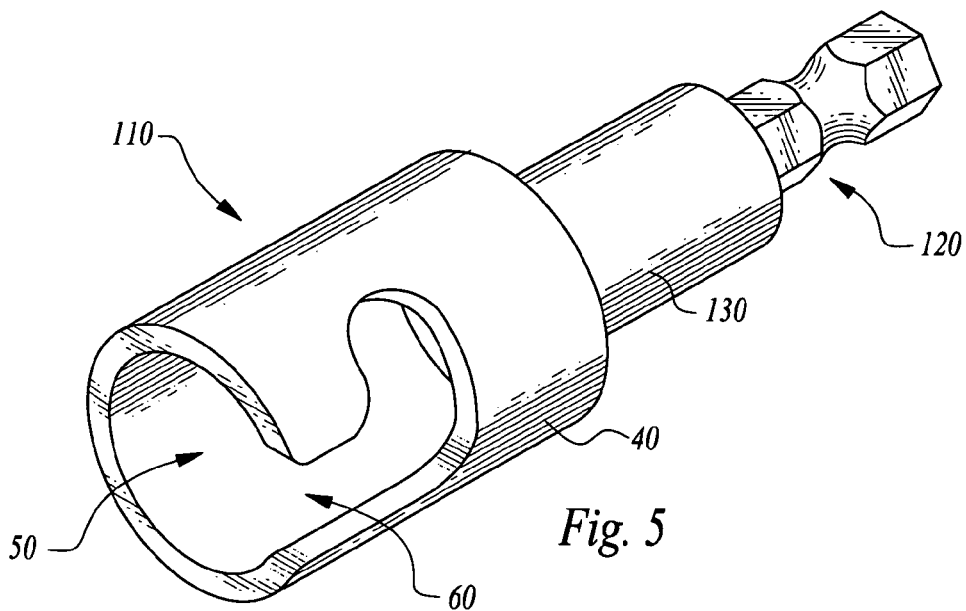
FIG. 5 is a perspective view of an alternative embodiment of the tool of FIG. 1 particularly featuring an alternate base between a shank and a cylinder thereof.
Figure 6:
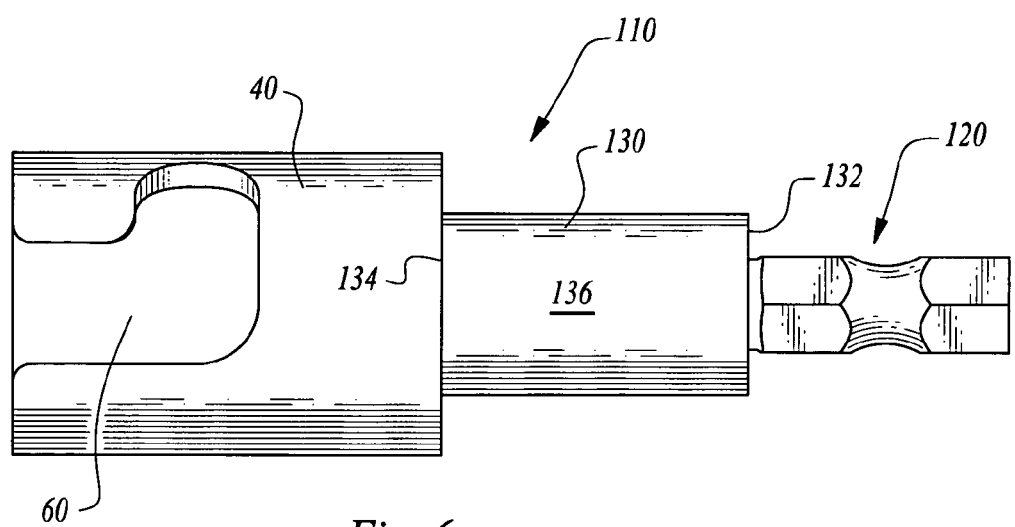
FIG. 6 is a front elevation view of that which is shown in FIG. 5.
Figure 7:
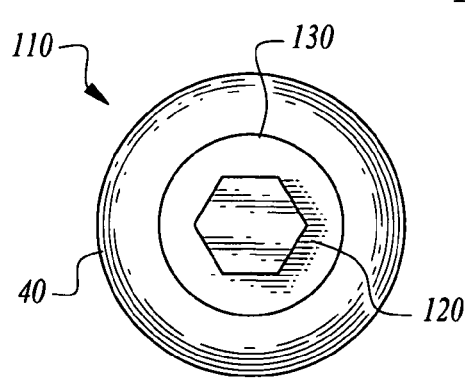
FIG. 7 is a right end elevation view of that which is shown in FIG. 6.
Figure 8:
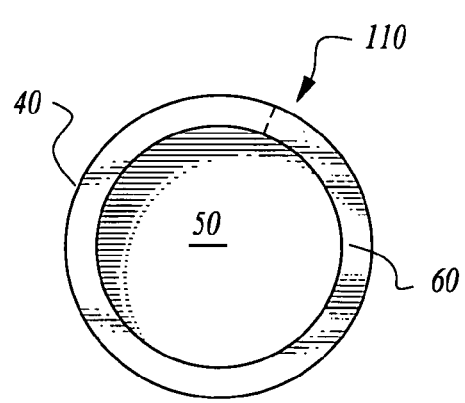
FIG. 8 is a left end elevation view of that which is shown in FIG. 6.
Figure 9:
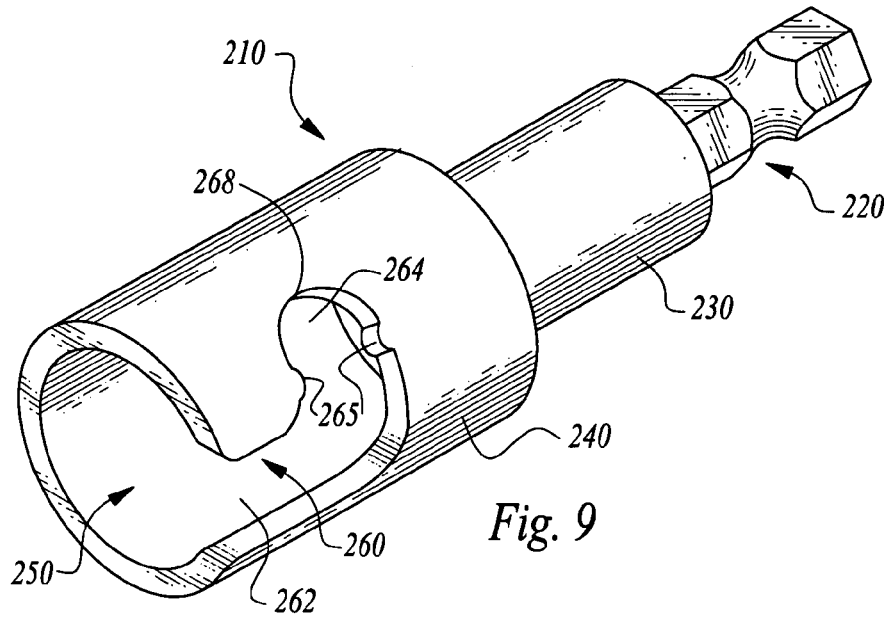
FIG. 9 is a perspective view of a second alternative embodiment of that which is shown in FIG. 1 with both an alternate base similar to that of the embodiment of FIG. 5 and with an alternate shank and cylinder that are longer in length and with an alternate slot with a longer circumferential leg, detents to help retain the arm of the reel adjacent the closed end of the slot, and with rounded corners for the slot.
Figure 10:
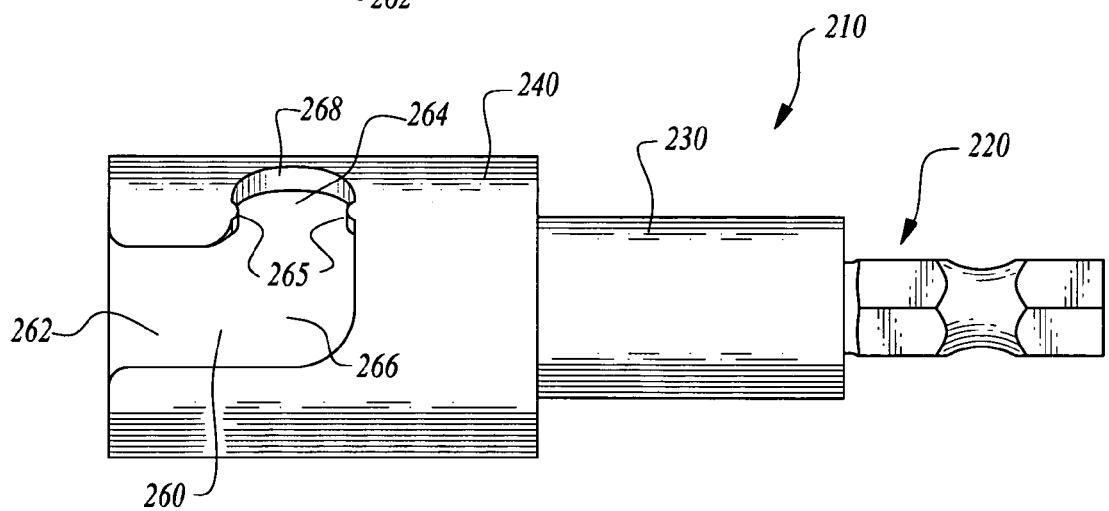
FIG. 10 is a front elevation view of that which is shown in FIG. 9 and with accurate proportions for lengths of the cylinder portion, base portion and shank portion according to this embodiment of the invention.
Figure 11:
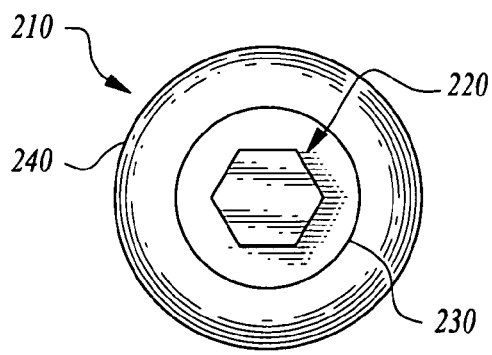
FIG. 11 is a right end elevation view of that which is shown in FIG. 10.
Figure 12:
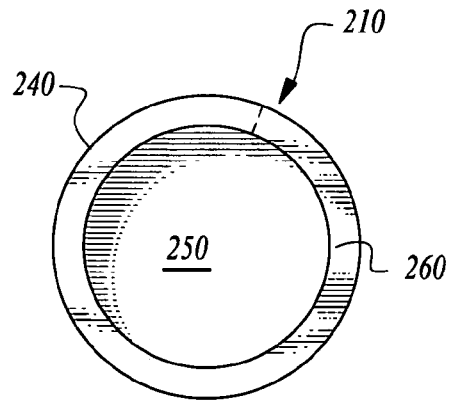
FIG. 12 is a left end elevation view of that which is shown in FIG. 10.

With particular reference to FIGS. 1 and 4, particular details of the bore 50 of this invention are described according to this preferred embodiment. The bore 50 extends into the free end 44 of the cylinder 40 and causes the cylinder 40 to be cylindrical in form and hollow. The bore 50 extends to a floor 52 which is preferably substantially flat and defining a portion of the bore 50 closest to the base 30. A wall 54 extends from the free end 44 of the cylinder 40 to the floor 52 within the bore 50. This wall 54 is preferably concentric with the outer surface 46 of the cylinder 40 so that a thickness of the hollow cylinder 40 between the outer surface 46 and wall 54 is substantially constant. The bore 50 can be formed by drilling into the free end 44 of the cylinder 40 or can be formed with the cylinder 40 and optionally along with the base 30 and shank 20, such as by utilizing some casting process or injection molding process.

With particular reference to FIGS. 1 and 2, particular details of the slot 60 are described according to this preferred embodiment. The slot 60 provides a preferred form of means to engage an arm or other rotating structure of a reel of a fishing rod. The slot 60 extends from the outer surface 46 to the wall 54 so that the slot 60 extends radially into the bore 50 within the cylinder 40. The slot 60 includes an axial leg 62 extending axially from an entry 61 at the free end 44 to a bend 66. The slot 60 then turns and extends circumferentially along a circumferential leg 64 to a closed end 68 spaced from the bend 66.

In this preferred embodiment the circumferential leg 64 is perpendicular to the axial leg 62 at the bend 66. As an alternative, the circumferential leg 64 could be only partially circumferential and also partially axial, either extending back towards the free end 44 somewhat or extending further from the free end 44 somewhat. In a simplest form of this invention, the slot 60 could merely include the axial leg 62 thereon without the bend 66 or circumferential leg 64, but rather just extending from the entry 61 to a closed end spaced from the entry 61. However, by also providing the circumferential leg 64, the probability of the arm A becoming axially displaced out of the slot 60 of the tool 10 during use is diminished.

Preferably only one slot 60 is formed in the cylinder for simplicity. However, an alternative embodiment could have a pair of slots of similar form on opposite sides of the cylinder 40. Such a dual slot cylinder could accommodate reels with two arms extending from opposite sides of the reel R. If such a dual slot cylinder is provided, it could work with reels R having one arm A or two arms, for usefulness with a greatest variety of reels R.

Also, the width of the slot 60 is preferably only slightly greater than a width of arms A to be held in the slot 60. If arms A of varying sizes need to be accommodated, edges of the slot 60 can be lined with a resilient liner, such as a rubber curb. This rubber curb could be sufficiently pliable to allow large arms A to fit in the slot 60 by flexing the rubber curb, while small arms would still be held within the slot 60. Another alternative is to fit a latch on the free end 44 of the cylinder adjacent the entry 61 into the slot 60 that has a closed position to keep the arm A captured in the slot and an open position that allows the arm A to pass into the slot A. The latch can be rigid and pivotably attached to the cylinder 40.

With particular reference to FIGS. 5-8, details of a first alternative tool 110 are described. This alternative tool 110 is similar to the tool 10 of the preferred embodiment except where particularly described herein. In particular, a shank 120 is provided similar to the shank 20 of the tool 10 of the preferred embodiment. This shank 120 is coupled to an alternative base 130. The alternative base 130 is cylindrical in form with a diameter less than a diameter of the outer surface 46 of the cylinder 40 and greater than a width of the shank 120. The cylinder 40 of this alternative tool 110 is similar to the cylinder 40 of the tool 10 of the preferred embodiment with a similar bore 50 and slot 60.

With this alternative tool 110, the simplicity of a merely cylindrical base 130 is provided. With such a configuration, the alternative base 130 can be generally cylindrical in form extending from a shank end 132 that is flat to a cylinder end 134 that is flat, and with an outside surface 136 that is cylindrical in form extending from the shank end 132 to the cylinder end 134. This cylindrical alternative base 130 is particularly useful where a shank 20 is to be coupled to a cylinder 40 through the alternative base 130 as three separate products that could merely be adhesively attached together or otherwise fastened together as axially aligned elongate generally cylindrical objects. The cylinder 40 could be provided as a hollow tube with the alternative base 130 threaded into the cylinder 40 or press fit into the cylinder 40 or otherwise bonded within the cylinder 40. Similarly, the shank 120 could be press fit into the cylindrical alternative base 130 (if formed to be hollow) or threaded into the cylindrical alternative base 130 or bonded therein. If threading is utilized, preferably the threads are oriented so that utilization of the drive D causes the shank 120, alternative base 130 and cylinder 40 to be drawn more tightly together through rotation by the drive D.

With particular reference to FIGS. 9-12, particular details of a second alternative tool 210 are described. The second alternative tool 210 includes a shank 220 similar to the shank 120 and shank 20 except that the second alternative shank 220 is longer. A base 230 is provided generally similar to the alternative base 130 of the alternative tool 110 (FIGS. 5-8). However, the second alternative base 230 is about fifty percent longer than the alternative base 130 of the alternative tool 110. The second alternative base 230 is coupled to a second alternative cylinder 240. The second alternative cylinder 240 is generally similar to the cylinder 40 of the preferred embodiment. However, it is preferably about fifty percent longer.

The slot 60 is provided with rounded corners and detents 265. Also, the circumferential leg 264 is slightly longer. In particular, while the bore 250 is similar to the bore 50 of the preferred embodiment, the slot 260 of this second alternative tool 210 includes an axial leg 262 similar to the axial leg 62 of the preferred embodiment and a circumferential leg 264 that is longer from the bend 266 to the closed end 268. Detents 265 are provide approximately midway between the closed end 268 and the bend 266. The detents 265 define a width of the circumferential leg 264 of the slot 260 that is less than a width of a typical arm A of a reel R. A width of the circumferential leg 264 and axial leg 262 spaced from the detents 265 is preferably either the same or greater in width than a width of the arm A of the reel R. In this way, the arm A can pass through the axial leg 262, around the bend 266 and then snap past the detents 265 before residing within the circumferential leg between the detents 265 and the closed end 268. The rounded corners on the slot 260 help to minimize any possibility of the tool 10 catching on or otherwise damaging adjacent structures.

Figure 13:
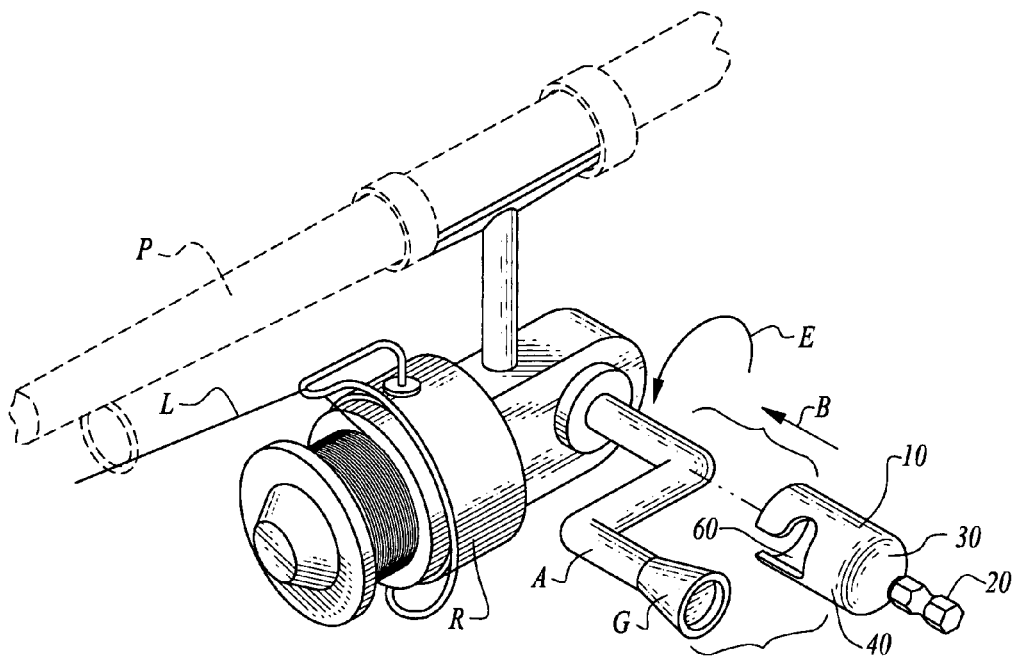
FIG. 13 is a perspective view of a fishing rod and reel with the tool of this invention aligned with and ready to be placed over an arm of the reel for loading of line onto the reel.
Figure 14:
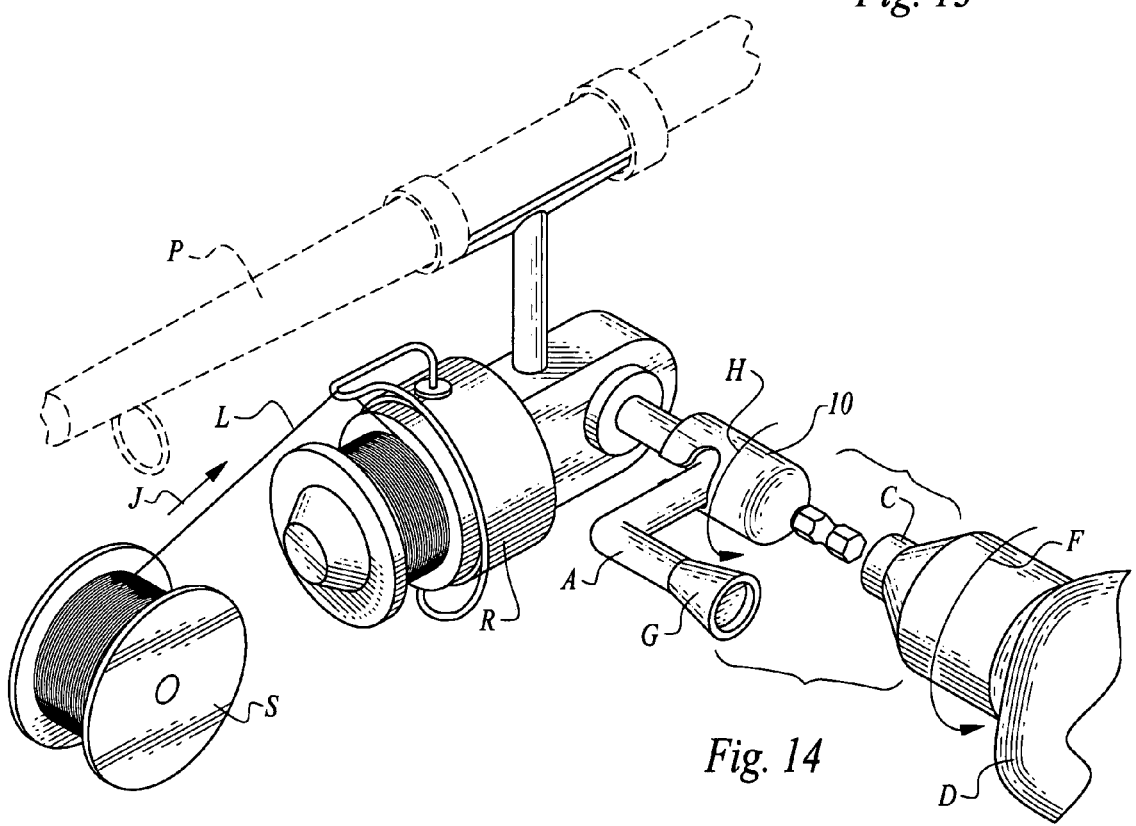
FIG. 14 is a perspective view similar to that which is shown in FIG. 13 but after the tool has been placed over the arm of the reel and the reel has been coupled to a line storage spool, and with a driver ready to be attached to the tool to cause rapid rotation of the grip to draw a line off of the line storage spool and onto the reel according to this invention.

In use and operation, and with particular reference to FIGS. 13 and 14, the tool 10 of this invention is utilized as follows. Initially, the fishing rod is provided with a pole P and a reel R. The reel R includes an arm A extending therefrom to a grip G. The arm A typically has a jog therein so that a portion of the arm A where the grip G is attached is spaced laterally from an axis of rotation of the arm A, where the arm A is coupled to the reel R. Initially, old line L might be on the reel R. This line L can be removed from the reel R, such as by taking a sharp knife and cutting all of the line L and pulling it off of the reel R. This technique is especially useful if the line L has become tangled. Next, new line L to be added to the reel R is threaded onto the reel R and attached or otherwise secured to the reel R off of a spool S (FIG. 14).

To engage the tool 10 to the arm A of the reel R, the tool 10 is first translated axially (along arrow B of FIG. 13) along an axis of rotation of the arm A. Portions of the arm A aligned with the axis of rotation pass into the bore 50 (FIG. 1) of the tool 10. Portions of the arm A which jog away from this axis of rotation pass into the slot 60. The tool 10 is then rotated (along arrow E of FIG. 13) to cause portions of the arm A that extend away from the axis of rotation to pass further into the slot 60 circumferentially and into the circumferential leg 64 of the slot 60 (FIG. 1).

The tool 10 could already be coupled to a drive D before being attached to the arm A of the reel R. Most preferably, however, the tool 10 is first secured onto the arm A when it can be easily handled without also being coupled to the drive D. The drive D is then brought adjacent the tool 10 and the chuck C of the drive D is caused to snap onto the shank 20 of the tool 10. The drive D can then be activated, such as by pulling on a trigger of the drive D in the form of an electric screwdriver or electric drill. The drive D then rotates (along arrow F of FIG. 14). This in turn causes the tool 10 to rotate (along arrow H of FIG. 14). The arm A also rotates (along arrow H of FIG. 14), causing line L to be drawn off of the spool S and onto the reel R (along arrow J of FIG. 14).

Preferably, the tool 10 is sufficiently long that the grip G is kept from impacting a drive D or other sensitive structures such as knuckles of the user depressing an activation switch on the drive D. Once sufficient line L has been drawn off of the spool S, the drive D is deactivated and removed from the tool 10. The tool 10 can then be readily rotated and translated (opposite arrows E and B of FIG. 13) to remove the tool 10 from the arm A. Finally, the line L can be rethreaded along the pole P and appropriately fitted with a hook and other tackle.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A tool for loading line onto a fishing reel, the tool comprising in combination:
   an elongate shank adapted to be coupled to a rotating driver;
   a cylinder rigidly and permanently coupled to said shank, a central axis of said cylinder aligned with a long axis of said shank, said cylinder including a bore extending axially into an end of said cylinder opposite said shank;
   a slot in a wall of said cylinder passing radially into said bore, said slot extending from an entry at an end of said cylinder opposite said shank to a closed end, said slot sufficiently wide to receive at least a portion of an arm of a reel of a fishing rod therein, such that said arm is caused to turn when said cylinder turns; and
   wherein said slot includes an axial leg adjacent a free end of said cylinder opposite said shank and a circumferential leg joined to said axial leg at a bend therebetween.

2. The tool of claim 1 wherein said shank includes a plurality of facets extending axially along sides of said shank.

3. The tool of claim 2 wherein said shank includes six facets such that said shank exhibits a hexagonal cross-section perpendicular to said long axis of said shank.

4. The tool of claim 1 wherein said cylinder has a free end opposite said shank that is circular and planar within a plane perpendicular to said central axis of said cylinder.

5. The tool of claim 1 wherein a base is provided between said cylinder and said shank joining said cylinder to said shank, said cylinder outer surface having a width perpendicular to said central axis greater than a width of said shank perpendicular to said long axis.

6. The tool of claim 5 wherein said base transitions from a wide end adjacent said cylinder to a narrow end adjacent said shank, said wide end greater in width than said narrow end.

7. The tool of claim 5 wherein said base is generally frustoconical in form.

8. The tool of claim 7 wherein said base exhibits a curving outer surface.

9. The tool of claim 5 wherein said base is cylindrical in form with a width perpendicular to said central axis and said long axis that is less than said width of said cylinder perpendicular to said central axis and greater than said width of said shank perpendicular to said long axis.

10. The tool of claim 1 wherein said circumferential leg is perpendicular to said axial leg at said bend.

11. The tool of claim 10 wherein said circumferential leg includes detents therein defining a narrow width portion of said circumferential leg spaced from a closed end of said circumferential leg of said slot.

12. The tool of claim 11 wherein said slot includes an entry at said free end of said cylinder most distant from said shank with said entry having rounded corners where said cylinder transitions from said free end to said slot; and
wherein said closed end of said circumferential leg of said slot includes rounded corners.

13. A method for loading line onto a reel of a fishing rod, the method including the steps of:
   securing to the reel an end of the line to be loaded onto the reel;
   providing a tool including an elongate shank adapted to be coupled to a rotating driver; a cylinder rigidly and permanently coupled to the shank, a central axis of the cylinder aligned with a long axis of the shank, the cylinder including a bore extending axially into an end of the cylinder opposite the shank; and a slot in a wall of the cylinder passing radially into the bore, the slot extending from an entry at an end of the cylinder opposite the shank to a closed end, the slot sufficiently wide to receive at least a portion of an arm of a reel of a fishing rod therein, such that the arm is caused to turn when the cylinder turns;
   coupling a rotating drive to the shank of the tool;
   placing an arm of the reel into the slot of the tool;
   activating the drive to cause tool rotation and in turn arm rotation and drawing of line onto the reel;
   wherein said providing step includes the step of forming the tool to have an axial leg adjacent a free end of the cylinder opposite the shank and a circumferential leg coupled to the axial leg at a bend therebetween; and
   wherein said placing step includes the step of translating the arm and the tool relative to each other to move the arm into the axial leg of the slot and then rotating the arm and the tool relative to each other to move the arm circumferentially into the circumferential leg of the slot.

14. The method of claim 13 wherein said providing step includes the step of forming the slot of the tool to have detents therein defining a narrow width portion of the circumferential leg spaced from a closed end of the circumferential leg of the slot, the circumferential leg further including the detents sized to be closer together than a width of the arm of the reel; and
   wherein said placing step includes the step of snapping the arm past the detents as the arm rotates circumferentially within the circumferential leg of the slot.

15. A fishing line reel loading tool, comprising in combination:
   a single mass of material including a shank adapted to be coupled to a rotating drive and a slot adapted to receive a rotating portion of the reel therein;
   wherein said slot is formed within a hollow cylinder with a bore extending axially into an end of said cylinder opposite said shank, said centerline of said cylinder substantially colinear with a long axis of said shank; and
   wherein said slot includes an axial leg adjacent a free end of said cylinder opposite said shank and a circumferential leg coupled to said axial leg at a bend therebetween.

16. The tool of claim 15 wherein said circumferential leg includes detents therein defining a narrow width portion of said circumferential leg spaced from a closed end of said circumferential leg of said slot.

* * * * *